(12) United States Patent
Hassan (10) Patent No.: US 8,559,825 B2
(45) Date of Patent: Oct. 15, 2013

(54) DIGITAL COMMUNICATION METHOD AND SYSTEM

(76) Inventor: M. Hassan Hassan, Windermere, FL (US)

( * ) Notice: Subject to any disclaimer, the term of this patent is extended or adjusted under 35 U.S.C. 154(b) by 382 days.

(21) Appl. No.: 12/972,475

(22) Filed: Dec. 19, 2010

(65) Prior Publication Data

US 2012/0155866 A1    Jun. 21, 2012

(51) Int. Cl.
*H04B 10/00*    (2013.01)

(52) U.S. Cl.
USPC ........... 398/140; 398/141; 398/115; 398/118; 398/45

(58) Field of Classification Search
USPC ......... 398/115, 116, 118, 127, 140, 141, 151, 398/153, 45, 398, 250; 330/4.7, 308
See application file for complete search history.

(56) References Cited

U.S. PATENT DOCUMENTS

| | | | |
|---|---|---|---|
| 447,918 | A | 3/1891 | Strowger |
| 1,303,084 | A | 5/1919 | Lundquist |
| 1,953,503 | A | 4/1934 | Reynolds |
| 2,309,744 | A | 2/1943 | Bedford |
| 2,410,840 | A | 11/1946 | Samuel |
| 2,472,428 | A | 6/1949 | Jones |
| 2,532,511 | A * | 12/1950 | Okolicsanyi ................. 348/284 |
| 2,734,938 | A | 11/1951 | Goodale |
| 3,746,903 | A | 7/1973 | Beeli et al. |
| 4,087,638 | A | 5/1978 | Hayes et al. |
| 4,809,260 | A | 2/1989 | Davidson et al. |
| 4,906,833 | A * | 3/1990 | Miyawaki et al. ...... 250/214 LS |
| 7,286,513 | B2 | 10/2007 | Nguyen |
| 2010/0012865 | A1 * | 1/2010 | Hogan .......................... 250/526 |

\* cited by examiner

*Primary Examiner* — M. R. Sedighian (57) ABSTRACT

The present disclosure includes a digital communication method and system for use in telephone exchanges, wireless and wired communication systems. The communication system uses hybrid wireless switches where communication links are established and data is transferred via modulated electron beams. The electron beams are controlled by electromagnetic field to target a specific output channel according to a unique identifying signature. The switch can concurrently process data from multiple users and supports half-duplex or full-duplex allowing receiving and transmitting data at the same time. The switch can concurrently communicate with other switches, stationary stations, and with mobile stations. The wireless switch can also act as a multiplexer and demultiplexer to connect users in a communication system or to transfer data, video and audio signals to subscribers from wireless, satellite, or local area networks. The hybrid wireless switch can transfer data among input and output channels according to unique identifying signatures assigned by the user.

9 Claims, 5 Drawing Sheets

DIGITAL COMMUNICATION METHOD AND SYSTEM

CROSS REFERENCE TO RELATED APPLICATIONS

This application claims the benefit of disclosure document No. 598787, filed 2006 Apr. 13 by the same inventor, and disclosure document No. 603780, filed 2006 Jul. 21 by the same inventor.

FEDERALLY SPONSORED RESEARCH AND DEVELOPMENT

Not Applicable

SEQUENCE LISTING OR PROGRAM

Not Applicable

BACKGROUND

Prior Art

The following is a tabulation of some prior art that presently appears relevant:

| U.S. patents | | | |
| --- | --- | --- | --- |
| U.S. Pat. No. | Kind Code | Issue Date | Patentee |
| 447,918 | A | 1891-03-10 | Strowger |
| 1,303,084 | A | 1919-05-6 | Lundquist |
| 1,953,503 | A | 1934-04-4 | Reynolds |
| 2,309,744 | A | 1943-02-2 | Bedford |
| 2,410,840 | A | 1946-11-12 | Samuel |
| 2,472,428 | A | 1949-06-7 | Jones |
| 2,532,511 | A | 1947-12-5 | Okolicsanyi |
| 2,734,938 | A | 1956-02-14 | Goodale |
| 3,746,903 | A | 1973-07-17 | Beeli et al. |
| 4,087,638 | A | 1978-05-2 | Hayes et al. |
| 4,809,260 | A | 1989-02-28 | Davidson et al. |
| 7,286,513 | B2 | 2007-10-23 | Nguyen |

1. FIELD OF THE INVENTION

The present invention relates generally to digital communication systems including telephone exchange systems, satellite communication systems, wireless communication systems, and alike and more specifically to a wireless switch for use in such communication systems.

2. BACKGROUND OF THE INVENTION

The Public Switched Telephone Network (PSTN), also known as Plain Old Telephone Service (POTS), is the wired phone system over which landline telephone calls are made. The PSTN relies on circuit switching. To connect one phone to another, the phone call is routed through numerous switches operating on a local, regional, national or international level. The connection established between the two phones is called a circuit.

In the early days, phone calls traveled as analog signals across copper wire. Every phone call needed its own dedicated copper wire connecting the two phones. That's why you needed operators' assistance in making calls. The operators sat at a switchboard, literally connecting one piece of copper wire to another so that the call could travel across town or across the country. Long-distance calls were comparatively expensive, because you were renting the use of a very long piece of copper wire every time you made a call.

Beginning in the 1960s, voice calls began to be digitized and manual switching was replaced by automated electronic switching. Digital voice signals can share the same wire with many other phone calls. The advent of fiber-optic cables now allows thousand of calls to share the same line. But fiber-optic and other high-bandwidth cables haven't changed the basic nature of circuit switching, which still requires a connection or a circuit to remain open for the length of the phone call.

Routing calls requires multiple switching offices often housed in big buildings and consume a large amount of energy. The phone number itself is a coded map for routing the call. In the United States, for example, we have 10-digit phone numbers. The first three digits are the area code or national destination code (NDC), which helps route the call to the right regional switching station. The next three digits are the exchange, which represents the smallest amount of circuits that can be bundled on the same switch. In other words, when one makes a call to another user in the same exchange (maybe a neighbor around the corner) the call doesn't have to be routed onto another switch. The last four digits of the phone number represent the subscriber number, which is tied to your specific address and phone lines. Within a company or larger organization, each employee or department might have its own extension. Extensions from the main phone number are routed through something called a private branch exchange (PBX) that operates on the premises.

To make an international call requires satellite and wireless communication networks with further instructions. The call needs to be routed through the local long-distance phone carrier to another country's long-distance phone carrier. To signal such a switch, you have to dial two separate numbers, your country's exit code (or international access code) and the corresponding country code of the place you're calling.

Almost all exit codes are either 00 or 011, although there are a few exceptions like Cuba (119) and Nigeria (009). Country codes are one- to three-digit prefixes that are assigned to specific countries or groups of countries. For example, the country code for the United States is 1, but the United States shares that country code with Canada and several smaller island nations like Jamaica, Puerto Rico and Guam. The country code for France is 33 and Ireland is 353.

3. DESCRIPTION OF THE PRIOR ART

Prior to the telephone, electrical switches were used to switch telegraph lines. One of the first people to build a telephone exchange was Tivadar Puskás in 1877 while he was working for Thomas Edison. George W. Coy designed and built the first commercial telephone exchange which opened in New Haven, Conn. in January, 1878. The switchboard was built from "carriage bolts, handles from teapot lids and bustle wire" and could handle two simultaneous conversations.

Later exchanges consisted of one to several hundred plug boards staffed by telephone operators. Each operator sat in front of a vertical panel containing banks of ¼-inch tip-ring-sleeve (3-conductor) jacks, each of which was the local termination of a subscriber's telephone line. In front of the jack panel laid a horizontal panel containing two rows of patch cords, each pair connected to a cord circuit. When a calling party lifted the receiver, a signal lamp near the jack would light. The operator would plug one of the cords (the "answering cord") into the subscriber's jack and switch her headset into the circuit to ask, "Number, please?" Depending upon the answer, the operator might plug the other cord of the pair (the "ringing cord") into the called party's local jack and start the ringing cycle, or plug into a trunk circuit to start what might be a long distance call handled by subsequent operators in another bank of boards or in other building, miles away.

In 1918, the average time to complete the connection for a long-distance call was 15 minutes. In the ringdown method, the originating operator called another intermediate operator who would call the called subscriber, or passed it on to another intermediate operator. This chain of intermediate operators could complete the call only if intermediate trunk lines were available between all the centers at the same time. In 1943 when military calls had priority, a cross-country US call might take as long as 2 hours to request and schedule in cities that used manual switchboards for toll calls.

In 1891, Almon Brown Strowger patented the stepping switch (Strowger, U.S. Pat. No. 447,919; Mar. 10, 1891), a device which led to the automation of telephone circuit switching. While there were many extensions and adaptations of this initial patent, the one best known consists of 10 levels or banks, each having 10 contacts arranged in a semicircle. When used with a rotary telephone dial, each pair of digits caused the shaft of the central contact "hand" of the stepping switch to first step (ratchet) up one level for each pulse in the first digit and then to swing horizontally in a contact row with one small rotation for each pulse in the next digit.

Later stepping switches were arranged in banks, the first stage of which was a linefinder (Jones, U.S. Pat. No. 2,472,428; Jun. 7, 1949). If one of up to a hundred subscriber lines had the receiver lifted "off hook", a linefinder connected the subscriber's line to a free first selector, which returned the subscriber a dial tone to show that it was ready to receive dialed digits. The subscriber's dial pulsed at about 10 pulses per second, although the speed depended on the standard of the particular telephone administration.

Exchanges based on the Strowger switch were eventually challenged by other exchange types and later by crossbar technology invented by Frank A. Lundquist (Lundquist, U.S. Pat. No. 1,303,084; May 6, 1919). These exchange designs promised faster switching and would accept pulses faster than the Strowger's typical 10 pps.

At a later date in mid 2002 the DTMF (Dual-tone multi-frequency signaling) "touch tones" signaling systems (Hayes et al., U.S. Pat. No. 4,087,638, May 2, 1978) was adopted. A transitional technology (from pulse to DTMF) had DTMF link finders which converted DTMF to pulse, to feed to older Strowger switches or crossbar switches.

In the field of the present invention, there are numerous numbers of patents granted using Strowger switches, crossbar switches, electronic switches, digital switches, and many other improvements and embodiments. Covering all these patents here is a very daunting task. However, all of these patents share the drawbacks of complex, immobile, and expensive switching systems that require large buildings to host, high maintenance requirements, and high power consumption. The present invention overcomes all the drawbacks of the prior art.

4. SUMMARY OF THE INVENTION

The invention is concerned with digital communication method and system for use in telephone exchanges, wireless communication systems, satellite communication systems, and other communication systems. In the present invention, wireless switches use modulated electron beams or alike; these electron beams are deflected to target a specific user according to a unique signature assigned to that user to make a communication link between two users. In one embodiment, the switch can concurrently process data from multiple users and supports half-duplex or full-duplex allowing receiving and transmitting data at the same time. The switch can concurrently communicate with other switches and/or with mobile stations. The switch acts as a multiplexer and demultiplexer to connect users in a communication system and/or to transfer data, video and audio signals to subscribers from wireless, satellite, and/or local area networks. If the data is for a user in the same basic service set of the switch, then, via a switch controller, the switch passes the data from the receiving path to the transmitting path. As a result, the data does not have to travel out of the switch and then back to the same switch again. The present invention allows synchronous transfer mode and asynchronous transfer mode for high speed transport of digital data.

5. BRIEF DESCRIPTION OF THE DRAWINGS

The accompanying drawings, which are incorporated in and constitute a part of the specification, illustrate embodiments of the invention, and together with the general description given above and the detailed description of the preferred embodiments given below, serve to explain the principles of the invention.

6. DETAILED DESCRIPTION OF THE INVENTION

The detailed description set forth below is intended as description of the presently preferred embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

With reference now to the drawings, the preferred embodiments will now be described in detail. The invention comprises in general of a wireless switch for use in any digital communication system such as telephone exchange systems, wireless communication systems, satellite communication systems or alike. A complete digital communication system incorporating the invention in its simplest form will be described with reference to FIG. 1A, FIG. 1B, FIG. 1C, and FIG. 5 of the drawings.

Figure 1A:
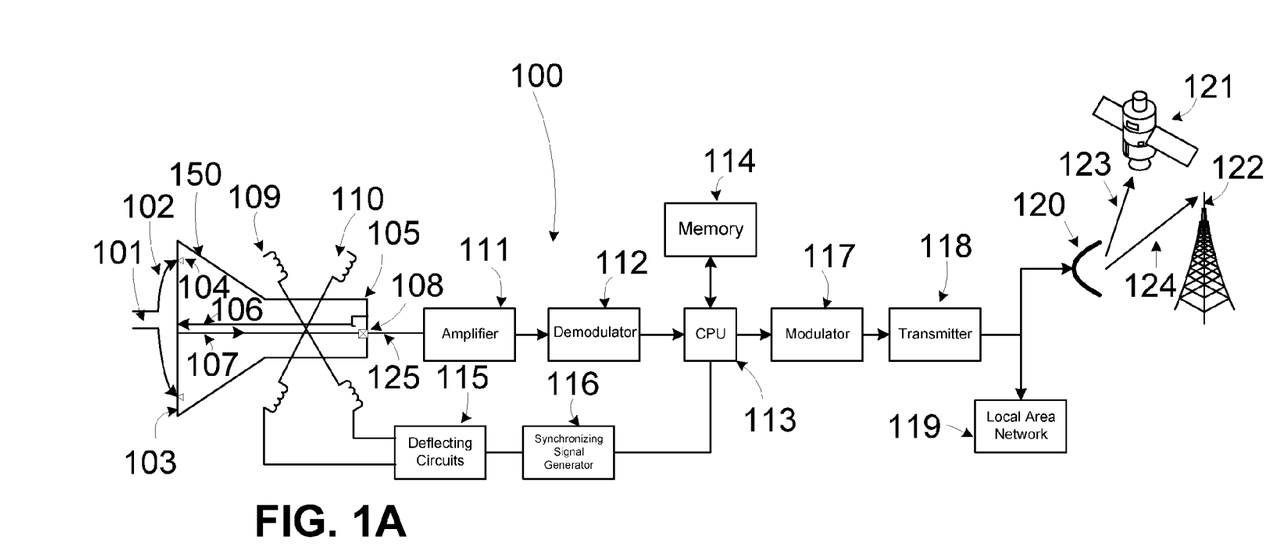
FIG. 1A shows a transmitting unit illustrating the invention in its simplest form, in accordance with one embodiment of the invention.
Figure 1B:
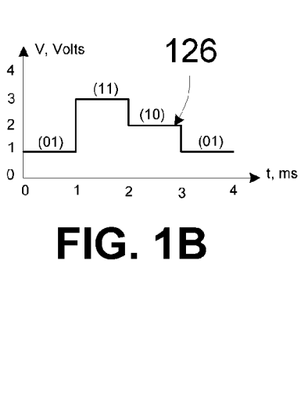
FIG. 1B shows an example of a four-level transmission of a binary data as input to the switch in FIG. 1A illustrating the invention in its simplest form, in accordance with one embodiment of the invention.
Figure 1C:
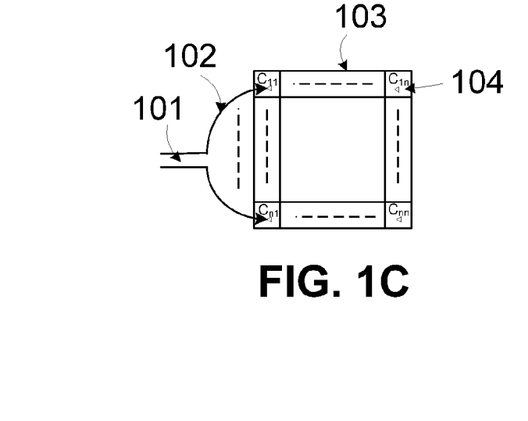
FIG. 1C shows a left-side view for the switch used in FIG. 1A illustrating the invention in its simplest form, in accordance with one embodiment of the invention.

FIG. 1A shows a block diagram of a transmitting unit illustrating the invention in its simplest form, in accordance with one embodiment of the invention. The transmitting unit 100 used to transmit binary data from $n^2$ users for any positive integer n using a wireless switch 150 acting as a multiplexer. The binary data is a modulated light signal where the modulating envelope is a multi-level representation of the binary data where each m bits of the binary data represented by one of $2^m$ voltage levels. FIG. 1B shows an example of quaternary (four-level) transmission signal 126 representing the binary data 01 11 10 01 where every binary pair is represented by one of 4 voltage levels such that the binary pair 00 is represented by 0 volt, the binary pair 01 is represented by 1 volt, the binary pair 10 is represented by 2 volts and the binary pair 11 is represented by 3 volts. The data is carried by an optical cable 101 which consists of $n^2$ optical fibers 102. FIG. 1C illustrates that each input channel 102 is applied to a specific cell in the scanning matrix 103 of the wireless switch 150. Each cell in the scanning matrix 103 has a photoelectron device 104 that converts photons to electrons proportional to the intensity level of the modulated light. The wireless switch has an electron beam gun 105 emitting the electron beam 106 that scans the scanning matrix 103 line by line covering all cells from cell $C_{11}$ to $C_{nn}$. The reflected electron beam 107 is intensity modulated according to the input, multi-level data received from the input channel 102. The electron multiplier 108 of the wireless switch 150 converts the modulated electron beam 107 to a multiplexed electrical signal 125. The signal 125 is applied to the amplifier 111 for amplification and restoration, and then converted to binary data by the demodulator 112. The CPU 113 acts as a controller for the wireless switch 150. The CPU 113 test the received data and perform all possible and necessary digital data communication techniques such as code conversion, code detection and correction, adjust the scanning rate and cells to be scanned by issuing commands to the synchronizing signal generator 116 and the deflecting circuits 115. The deflecting circuits 115 accordingly control the deflection of the electron beam 106 and the rate of deflection to insure valid transfer of data from all users who are transmitting data. The memory 114 used to save all digital communication algorithms and techniques as well as look-up tables used for the deflecting circuits 115 to ensure accurate transfer of data. The CPU 113 will form the multiplexed data in two possible frames: synchronous transfer mode (STM) 500 or asynchronous transfer mode (ATM) 501. The ATM 501 is faster since it transfers data only from channels in use with valid data and ignore the channels with no data. Each packet for each channel in the STM 500 and the ASM 501 frames is tagged by a unique signature representing the transmitting user identification and the receiving user identification. For telephone exchanges the signature consists of international exit code, the country code, the city code, and the exchange code. This signature may also contain other information such as the ground positioning system's (GPS) coordinates of the mobile user or the mobile tower for wireless communication. The CPU 113 delivers the multiplexed data to the modulator 117 then the modulated data is amplified and transmitted by the transmitter 118 via the antenna 120. Data then transmitted to the satellite 121 via the electromagnetic waves 123 or to a mobile station tower 122 via the electromagnetic waves 124 or routed to a local area network 119. The cable 101 can be a metallic electrical cable and the conductors 102 can be metallic electrical conductors if the cell receiving devices 104 equipped with electrical-photo-electrons converters that adequately modulates the intensity of the reflected electron beam 107 according to the input data received from the input channels 101. The cell devices 104 are similar to those used in television cameras or alike.

Figure 2A:
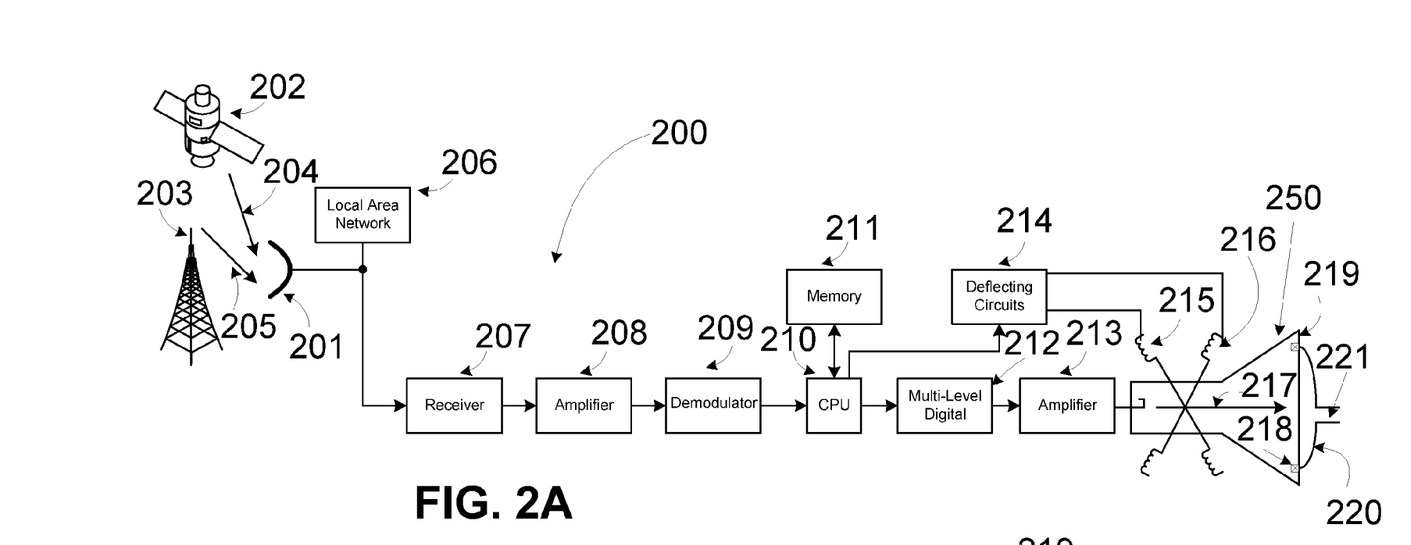
FIG. 2A shows a receiving unit illustrating the invention in its simplest form, in accordance with one embodiment of the invention.
Figure 2B:
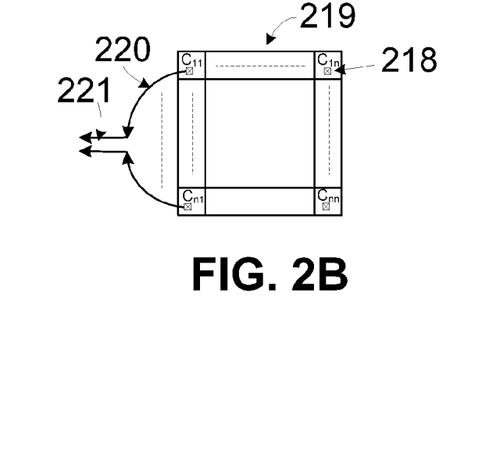
FIG. 2B shows a right-side view for the switch used in FIG. 2A illustrating the invention in its simplest form, in accordance with one embodiment of the invention.

FIG. 2A represents a block diagram of a receiving unit illustrating the invention in its simplest form, in accordance with one embodiment of the invention. In the receiving unit, multiplexed data received by the receiver's 207 antenna 201 from a satellite 202 via electromagnetic waves 204 or from a wireless tower 203 via electromagnetic waves 205. The multiplexed data is forwarded to the amplifier unit 208 for amplification and restoration then demodulated to binary data by the digital demodulator unit 209 according to the digital modulation used. The demodulated data is forwarded to the CPU 210 to perform data correction and decoding where all algorithms, look-up tables, and digital communication techniques are stored in the memory 211. Binary data forwarded by CPU 210 to a multi-level digital decoding unit 212 where binary data is converted to a multi-level binary similar to that of FIG. 1B. The multi-level data is applied to a wireless switch 250 acting as a demultiplexer to demultiplex the received data to its corresponding channels 220 and pass it to the corresponding users via the cable 221. According to the signature of each receiving channel, the CPU 210 controls the deflecting circuits 214 that control the deflection of the modulated electron beam 217 by controlling the deflecting coils 215 and 216. The CPU 210 will determine the necessary deflection of the electron beam 217 according to the signatures of the received packets of data using synchronized cell by cell and line by line scanning according to STM 500 or by selecting the required cells that needs to be scanned using ASM 501. FIG. 2B illustrates all the cells in the scanning matrix 219 of the wireless switch 250. When the modulated electron beam 217 projected into a cell within the matrix 219, the cell's device 218 converts the intensity of the electron beam 217 to a modulated light if the conductors 220 are optical fibers and the cable 221 is an optical cable; or otherwise, the cell's receiving devices 218 converts the modulated electron beam 217 to multi-level electrical signals if the conductors 220 are metallic electrical conductors and the cable 221 is a metallic electrical cable. The cells' receiving device 218 is as simple as an open-base transistor, open-gate metal-oxide-semiconductor transistor, or alike.

Figure 3A:
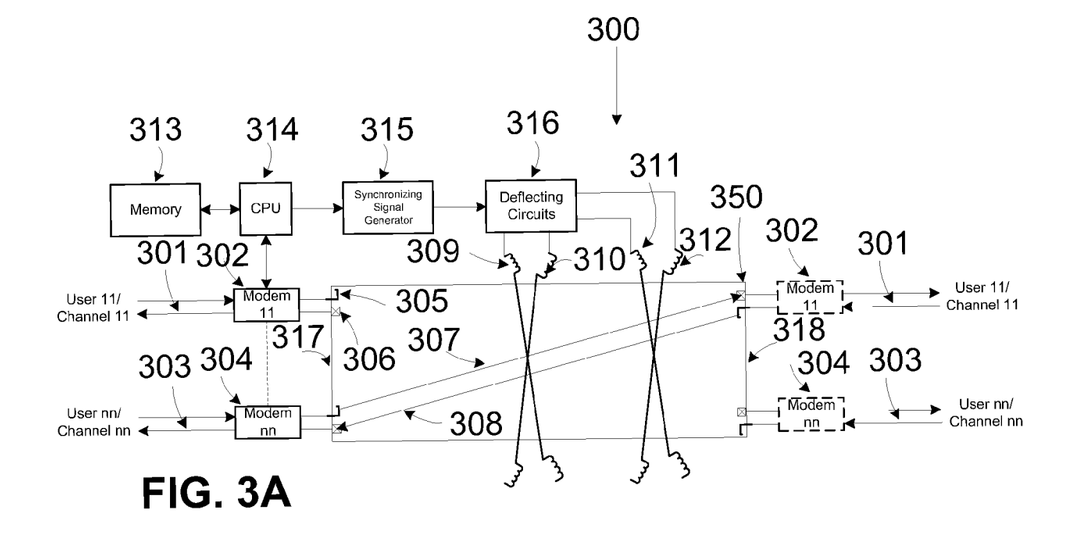
FIG. 3A shows a full-duplex switch illustrating the invention in its simplest form, in accordance with one embodiment of the invention.
Figure 3B:
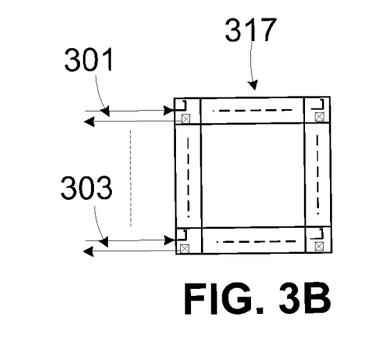
FIG. 3B shows a left-side view for the switch used in FIG. 3A illustrating the invention in its simplest form, in accordance with one embodiment of the invention.
Figure 3C:
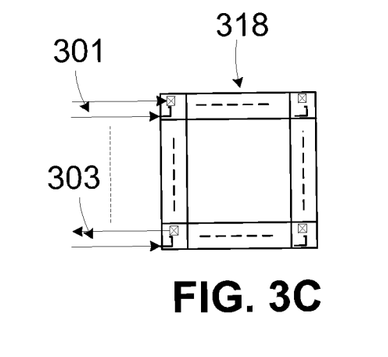
FIG. 3C shows a right-side view for the switch used in FIG. 3A illustrating the invention in its simplest form, in accordance with one embodiment of the invention.

Now with reference to FIG. 3A, FIG. 3B, FIG. 3C, and FIG. 5 of the drawings, FIG. 3A shows a full-duplex switch 350 illustrating the invention in its simplest form, in accordance with one embodiment of the invention. FIG. 3B shows the left-side view 317 for the switch 350 used in FIG. 3A while FIG. 3C shows the right-side view 318 for the switch 350 used in FIG. 3A. FIG. 3A illustrates as an example for a communication link between channel 301 and channel 303. The wireless switch 350 supports full-duplex allowing receiving and transmitting data at the same time between users in the same basic service set. Each user is served by one channel 301 with transmit data line and receive data line, which can be combined in one line as a duplexer (not shown).

The data is amplified, modulated, and demodulated by the modem 302. The CPU 314 acting as a controller performs all necessary digital communication algorithms to ensure valid transfer of data. The memory 313 used to save all such algorithms and look-up tables to control the deflection of the electron beams 307 and 308. The CPU 314 issues the appropriate commands based on the signature of the destination channel embedded in the data packets 500 or 501 to the synchronizing signal generator 315 and the deflecting circuits 316 to control the deflection of two electron beams 307 and 308 between two channels 301 and 303 by controlling the voltages for the deflection coils 309 and 310 and the deflection coils 311 and 312, respectively. The transmit data line is forwarded to an electron gun 305 where the modulated electron beam 307 is deflected to target the receiving device 306 of another channel within the same basic service set. The receive data line fetches the data from the receiving device 306. The locations of the electron gun 305 and the receiving device 306 are alternated on right side scanning matrix 318 from the locations on the left-side scanning matrix 317. The electron gun device 305 emits intensity modulated electron gun while the receiving device 306 converts the modulated electron beam 307 to a corresponding modulated light or to multi-level digital transmission according whether the channels 301 are optical fibers or metallic electrical conductors. The CPU 314 controls the scanning of the two scanning matrices 317 and 318 according to STM 500 and ASM 501 and based on the users requesting service within the basic service set. The wireless switch 350 establishes the communication links among $n^2$ channels serving $n^2$ users for any positive integer n within the technological manufacturing limits. The wireless switch 350 can serve unlimited number of wireless networks, mobile stations, and mobile telephones independent on the carrier frequency of the modulated wave when GPS coordinates information are added to the signatures of all users in the basic service set. The system 300 can continue tracking the mobile station or telephone as the GPS coordinates change, accordingly.

Figure 4:
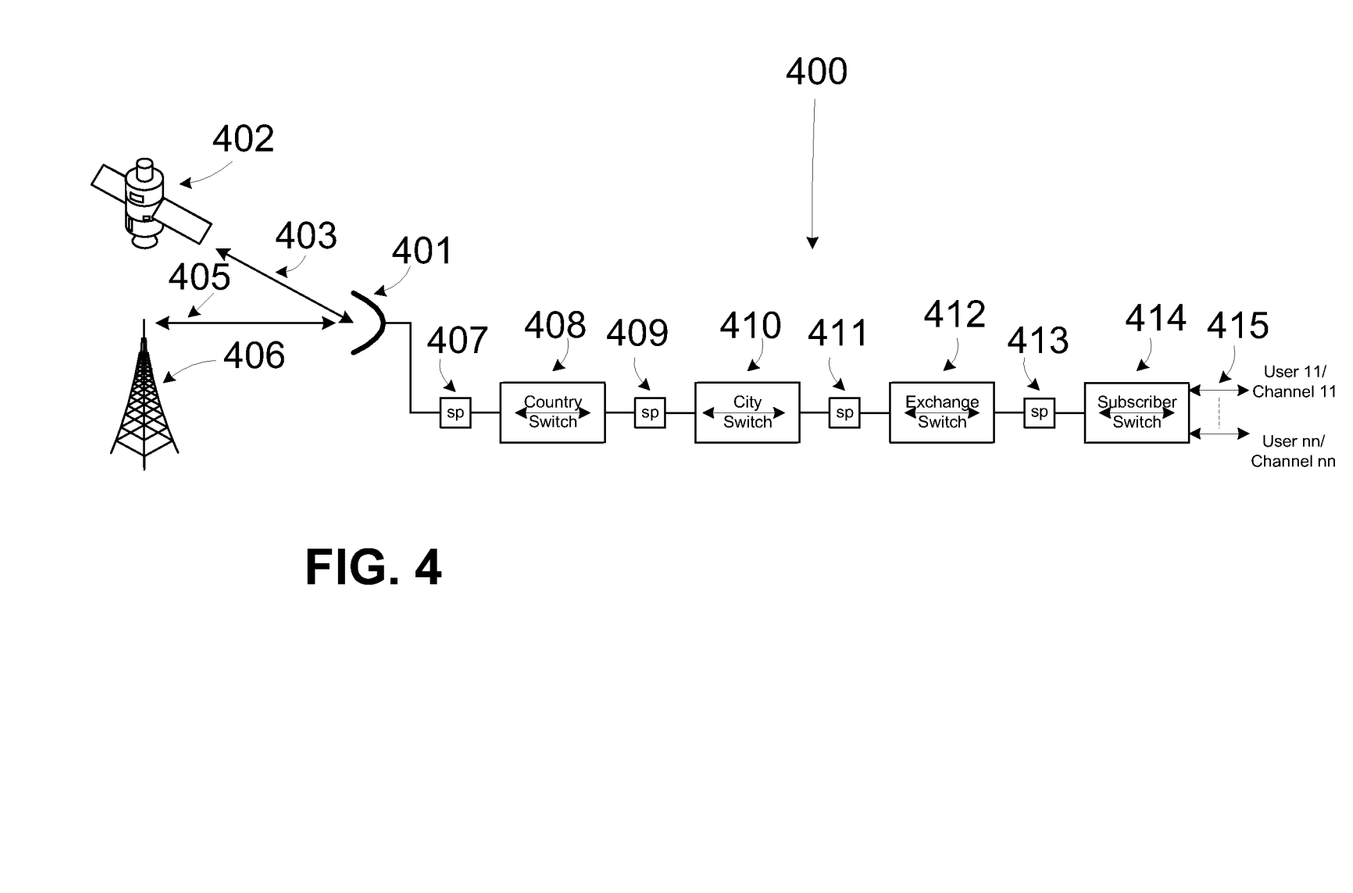
FIG. 4 shows an international telephone exchange system using multiple wireless switches illustrating the invention in its simplest form, in accordance with one embodiment of the invention.
Figure 5A:
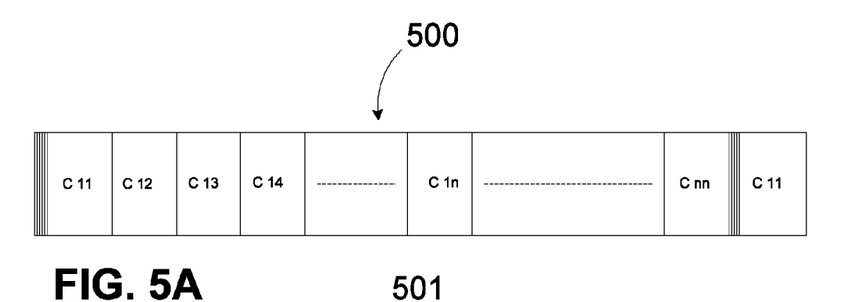
FIG. 5 shows data frames for asynchronous transfer mode (ATM) and synchronous transfer mode (STM) illustrating the invention in its simplest form, in accordance with one embodiment of the invention.
Figure 5B:
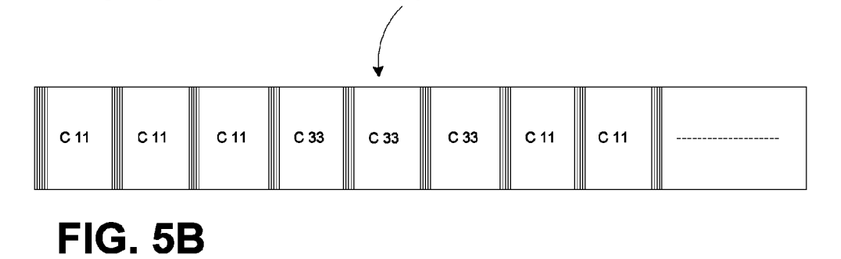

FIG. 4 shows an international telephone exchange system 400 using multiple wireless switches 408, 410, 412, and 414 illustrating the invention in its simplest form, in accordance with one embodiment of the invention. FIG. 4 shows an example of signature portioning technique which can be extended to unlimited systems and embodiments of the invention. Each signal processing unit 407, 409, 411, 413 may have a CPU, memory, modulator, demodulator, deflecting circuits, synchronizing circuits, deflecting coils, duplexer, and alike. The modulated communication signal received by the antenna 401 from the satellite 402 via electromagnetic waves 403 or from a wireless tower 406 via electromagnetic waves 405. The data received and processed by the signal processing unit 407 where the data is demodulated, decoded and modulated then forwarded to the country switch 408 where the electron beam is deflected according to the country code embedded in every packet of the data. The signal then decoded and processed by the signal processing unit 409 and forwarded to the city switch 410 where the electron beam is deflected to target the cell specified for the city code embedded in the signature; then, signal forwarded to the signal processing unit 411 then to the exchange switch 412 where the electron beam is targeted to the cell specified for that exchange; and finally the signal is forwarded to the signal processing unit 413 then to the subscriber switch 414 to serve $n^2$ users for any positive integer n. As an example, if the phone call is made to 44 208 945 1234. The signal is deflected to target cell 44 in the country switch 408 where the country is the United Kingdom; then deflected to the cell 208 in the city switch 410 where 208 is the city code for the city of London; then the signal is deflected to target cell 945 in the exchange switch 412; then the signal is targeted to cell 1234 in the subscriber switch 414 to target the subscriber 1234. The system 500 may find other applications in digital radio, digital television, and any other subscriber based services.

In summary, the present invention includes a communication apparatus, comprising: a plurality of transmitting channels; a plurality of receiving channels; a transmitting means; a receiving means; and a plurality of wireless switch means driven by a plurality of modulated electron beam means; wherein the modulated electron beam means establishing communication links and transferring data between transmitting channels and receiving channels.

As shown in FIG. 1A, the transmitting means comprising: a first wireless switch, a first modulator, and a first transmitter. The first wireless switch comprising: a fiber array made of n input fibers that form one or more input ports to input one or more modulated light signals, or alternatively a wire array made of n input wires that form one or more input ports to input one or more modulated electrical signals; electron beam generation means to convert input light signals to modulated electron beams, or alternatively input electrical signals to modulated electron beams, electron beam deflection devices; electron beam conversion means which converts modulated electron beam to modulated electrical signal, or alternatively to modulated optical signal; one wire which forms one output port to output an electrical signal; and a controller and memory means. Hence, the first wireless switch performs time division multiplexing to multiplex n input electrical signals from said n input wires, or alternatively n input optical signals from said n input fibers and outputs the said multiplexed signal to the said one output port. The controller and memory means ensures accuracy of data transfer, controls the sequence of multiplexed channels in an output data frame, adds a unique identifying signature for each input channel; adding a frame identification signature for the output data frame, and controls electron beam deflection devices. The first modulator performs digital modulation for the time-multiplexed signal; and the first transmitter performs amplification and transmission for the time-multiplexed signal to wireless networks, or alternatively to wired networks.

The receiving means, as shown in FIG. 2A, comprising: a second receiver, second control and memory means, second modulator; and a second wireless switch. The second receiver receives multiplexed data from wired networks, or alternatively wireless networks, amplifying said received multiplexed data, and demodulating said received multiplexed data. The received multiplexed data constitute data from multiple channels each with a unique identifying signature. The second modulator performing multi-level digital modulation on said received multiplexed data; wherein the second wireless switch comprising: one wire that form one input port to input an electrical signal to said second wireless switch; an electron beam generation means to convert said input modulated electrical signal to modulated electron beam; a fiber array made of n output fibers that form one or more output ports to output one or more modulated light signals, or alternatively a wire array made of n output wires that form one or more output ports to output one or more modulated electrical signals; electron beam deflection devices; electron beam conversion means which converts modulated electron beams to modulated electrical signals or alternatively to modulated optical signal; and wherein second control and memory means which performs data analysis, identification of channels received, and controls the second wireless switch to deliver a plurality of output signals to a plurality of said output port according to said unique identifying signature for every signal. The second wireless switch performs demultiplexing to demultiplex n output electrical signals to the n output wires or alternatively n output optical signals to the n output fibers and outputting each signal to its prospective output port according to the identifying signature for every signal. The identifying signature can carry unique information to identify stationary channels and mobile channels. The identifying signature can also be partitioned to a plurality of wireless switches, as shown in FIG. 4.

Referring to FIG. 3A, the current disclosure presents a hybrid wireless switch apparatus, comprising: a fiber array made of n fibers that form one or more input ports to input one or more modulated light signals, or alternatively a wire array made of n wires that form one or more input ports to input one or more modulated electrical signals; a fiber array made of m fibers that form one or more output ports to output one or more modulated light signals, or alternatively a wire array made of m wires that form one or more output ports to output one or more modulated electrical signals; an input sensor array to convert either modulated input light signals or modulated input electrical signals to modulated electron beams; control and deflection means to deflect modulated electron beams input ports to output ports according to predefined unique signature; an output sensor array to convert modulated electron beams to modulated output light signals or modulated output electrical signals; wherein the predefined unique signature is either embedded within the input signal or stored in the control and memory means. Additionally, the input ports and the output ports are placed on both transmitting side and receiving side of the hybrid wireless switch apparatus for full-duplex operation. The signature can be partitioned to a plurality of hybrid wireless switch apparatuses. The hybrid wireless switch can transfer data among input and output channels according to unique identifying signatures assigned by the user. For instance, data from one input channel can be transferred to a number of output channels, and vise versa.

The disclosure also includes a hybrid digital communication apparatus comprising: at least one of the hybrid wireless switch apparatus. This hybrid digital communication apparatus is a hybrid telephone exchange in one embodiment of the invention.

While there have been described above the principles of this invention in connection with specific apparatus, it is to be clearly understood that this description is made only by way of example and not as a limitation to the scope of the invention. It should be apparent that the foregoing relates only to the preferred embodiments of the present invention and that numerous changes and modifications may be made herein without departing from the spirit and the scope of the invention as defined by the following claims and equivalents thereof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus the scope of the invention should be determined by the appended claims and their legal equivalents, rather than by the examples given.

I claim:

1. A digital communication apparatus, comprising: a plurality of transmitting channels; a plurality of receiving channels; a transmitting means; and a receiving means;

wherein said transmitting means comprising: a first wireless switch, a first modulator, and a transmitter;

wherein said first wireless switch comprising: a fiber array made of n input fibers that form one or more input ports to input one or more modulated light signals, or alternatively a wire array made of n input wires that form one or more input ports to input one or more modulated electrical signals; electron beam generation means to convert input light signals to modulated electron beams, or alternatively electron beam generation means to convert input electrical signals to modulated electron beams, electron beam deflection means; electron beam conversion means which converts modulated electron beam to modulated electrical signal, or alternatively to modulated optical signal; one output fiber that form one output port to output one multiplexed optical signal, or alternatively one wire which forms one output port to output a multiplexed electrical signal; and a controller and memory means;

wherein said first wireless switch performs time division multiplexing to multiplex n input electrical signals from said n input wires, or alternatively n input optical signals from said n input fibers and outputs the said multiplexed signal to the said one output port;

wherein said controller and memory means for performing accuracy of data transfer, controlling the sequence of multiplexed channels in an output data frame, adding a unique identifying signature for each input channel, adding a frame identification signature for said output data frame, and controlling said electron beam deflection devices;

wherein said first modulator performing digital modulation for the said time-multiplexed signal; and wherein said transmitter performing amplification and transmission for said time-multiplexed signal to wireless networks, or alternatively to wired networks;

wherein said receiving means comprising: a receiver, second control and memory means, second modulator; and a second wireless switch;

wherein said receiver receives multiplexed data from wired networks, or alternatively wireless networks, amplifying said received multiplexed data, and demodulating said received multiplexed data;

wherein said received multiplexed data constitute data from multiple channels each with a unique identifying signature;

wherein second modulator performing multi-level digital modulation on said received multiplexed data;

wherein said second wireless switch comprising: one wire that form one input port to input an electrical signal to said second wireless switch; an electron beam generation means to convert said input modulated electrical signal to modulated electron beam; a fiber array made of n output fibers that form one or more output ports to output one or more modulated light signals, or alternatively a wire array made of n output wires that form one or more output ports to output one or more modulated electrical signals; electron beam deflection devices; electron beam conversion means which converts modulated electron beams to modulated electrical signals or alternatively to modulated optical signal;

wherein said second control and memory means performs data analysis, identification of channels received, and controls the said second wireless switch to deliver a plurality of output signals to a plurality of said output port according to said unique identifying signature for every signal; and wherein said second wireless switch performs demultiplexing to demultiplex n output electrical signals to said n output wires or alternatively n output optical signals to said n output fibers and outputting each signal to its prospective output port according to said identifying signature for every signal.

2. The digital communication apparatus as claimed in claim 1, wherein the said identifying signature carries unique information to identify stationary channels.

3. The digital communication apparatus as claimed in claim 1, wherein the said identifying signature carries unique information to identify mobile channels.

4. The digital communication apparatus as claimed in claim 1, wherein the said identifying signature is partitioned to a plurality of wireless switches.

5. A hybrid wireless switch apparatus, comprising:

a fiber array made of n fibers that form one or more input ports to input one or more modulated light signals, or alternatively a wire array made of n wires that form one or more input ports to input one or more modulated electrical signals;

a fiber array made of m fibers that form one or more output ports to output one or more modulated light signals, or alternatively a wire array made of m wires that form one or more output ports to output one or more modulated electrical signals;

an input sensor array to convert either modulated input light signals or modulated input electrical signals to modulated electron beams;

a control and memory means to deflect modulated electron beams from input ports to output ports according to predefined unique signature;

an output sensor array to convert modulated electron beams to modulated output light signals or modulated output electrical signals;

wherein said predefined unique signature is either embedded within said input signal or stored in said control and memory means.

6. The hybrid wireless switch apparatus as claimed in claim 5, wherein input ports and output ports are placed on both transmitting and receiving sides of the said hybrid wireless switch apparatus for full-duplex operation.

7. A hybrid digital communication apparatus comprising: at least one of said hybrid wireless switch apparatus as claimed in claim 6.

8. The hybrid digital communication apparatus as claimed in claim 7, wherein the said hybrid digital communication apparatus is a hybrid telephone exchange.

9. The hybrid wireless switch apparatus as claimed in claim 5, wherein the signature is partitioned to a plurality of hybrid wireless switch apparatuses.

\* \* \* \* \*